May 10, 1960 — C. C. FOSTER — 2,936,163
BAR ACCESSORY
Filed Aug. 15, 1956 — 2 Sheets-Sheet 1

INVENTOR.
Carroll C. Foster
BY *Victor J. Evans & Co.*
ATTORNEYS

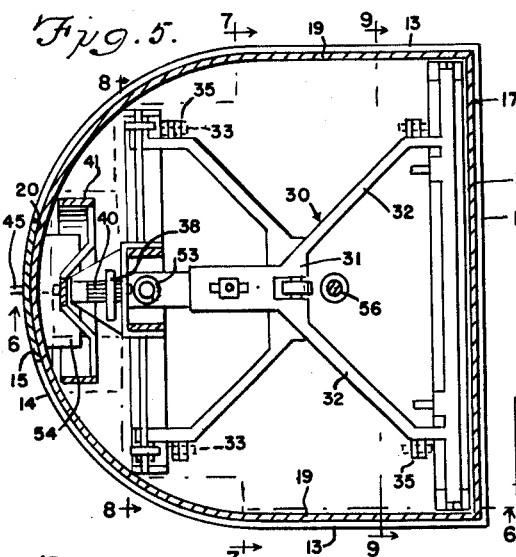

United States Patent Office 2,936,163
Patented May 10, 1960

2,936,163
BAR ACCESSORY

Carroll C. Foster, Derby, Conn.

Application August 15, 1956, Serial No. 604,280

5 Claims. (Cl. 265—27)

This invention relates to a bar accessory.

The object of the invention is to provide a bar accessory which will indicate the amount of fluid or liquid such as liquor that has been used up or dispensed.

Another object of the invention is to provide a bar accessory which is in the nature of a device for supporting a plurality of bottles of alcoholic beverages such as liquor or the like, and whereby after the alcoholic beverages have been dispensed or sold to customers or patrons by a bartender or the like, there is provided a scale which will indicate the amount of beverages that have been dispensed so that the proprietor of the barroom or other establishment can have an accurate indication of the exact amount of beverage that has been dispensed.

A further object of the invention is to provide a means for accurately weighing and indicating the amount of alcoholic beverage that has been dispensed so that the proprietor of an establishment having the device therein can readily check on the efficiency of the bartender as well as quickly ascertain the honesty of the employees.

A further object of the invention is to provide a bar accessory which is extremely simple and inexpensive to manufacture.

Other objects and advantages will be apparent during the course of the following description.

In the accompanying drawings, forming a part of this application, and in which like numerals are used to designate like parts throughout the same.

Figure 5 is a horizontal sectional view taken through the device and showing portions of the scale within the base.

Figure 6 is a sectional view taken on the line 6—6 of Figure 5.

Figure 7 is a sectional view taken on the line 7—7 of Figure 5.

Figure 8 is a sectional view taken on the line 8—8 of Figure 5.

Figure 9 is a sectional view taken on the line 9—9 of Figure 5.

Figure 10 is a fragmentary elevational view illustrating certain constructional details of the scale.

Figure 1:
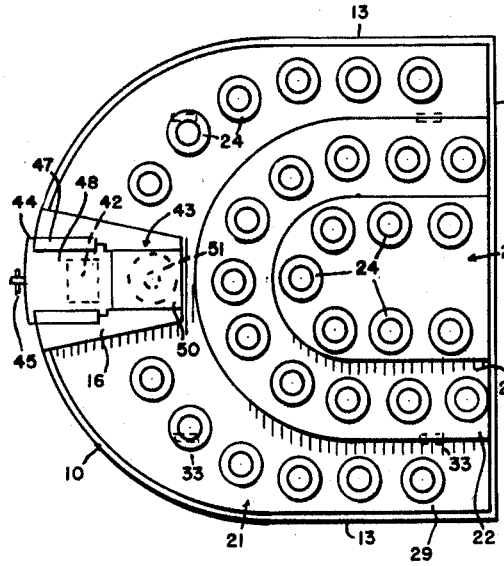
Figure 1 is a top plan view of the bar accessory, constructed according to the present invention.

Referring in detail to the drawings, the numeral 10 designates a base which includes a horizontally disposed bottom wall 11 that has a vertically disposed back wall 12 extending upwardly therefrom, Figure 6. The base 10 further includes a pair of spaced apart side walls 13 which may be interconnected by a curved front wall 14. Extending upwardly from the front wall 14 is a vertically disposed leg 15 which terminates in a horizontal flange 16.

Telescopically or movably mounted above the base 10 is a hollow housing 17, Figure 5. The housing 17 includes a flat vertically disposed back portion 18 as well as spaced apart side portions 19 and a curved front portion 20. These portions 18, 19 and 20 slidably engage the inner surfaces of the walls of the base 10. The housing 17 further includes a plurality of sections 21, 22, and 23, and these sections may be of different sizes, the sections serving to support bottles 24 of alcoholic beverages, such as liquor, gin, or the like. While the drawings illustrate three sections 21, 22 and 23, it is to be understood that the number and size of the sections can be varied as desired.

The section 23 may include a horizontal wall 25 and a vertical wall 26, while the section 22 may include a horizontal wall 27 and vertical walls 28. The lower section 21 may include a horizontal wall, and the walls 29, 27 and 25 may provide supports for the liquor bottles 24.

Figure 2:
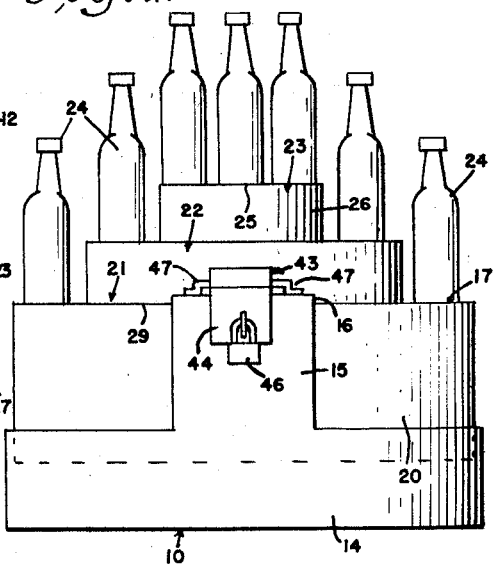
Figure 2 is a front elevational view of the device of the present invention.
Figure 3:
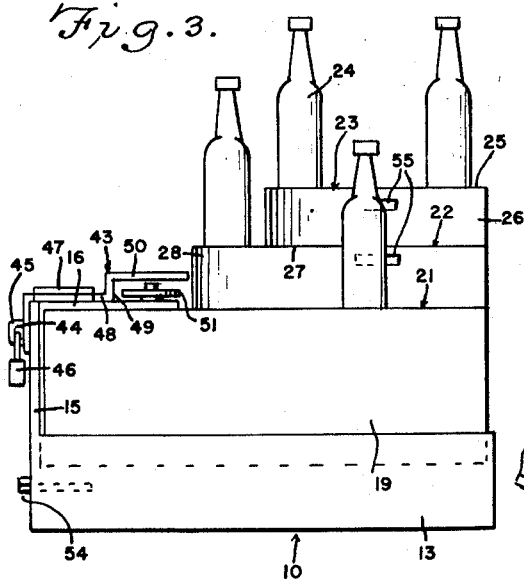
Figure 3 is a side elevational view of the unit.
Figure 4:
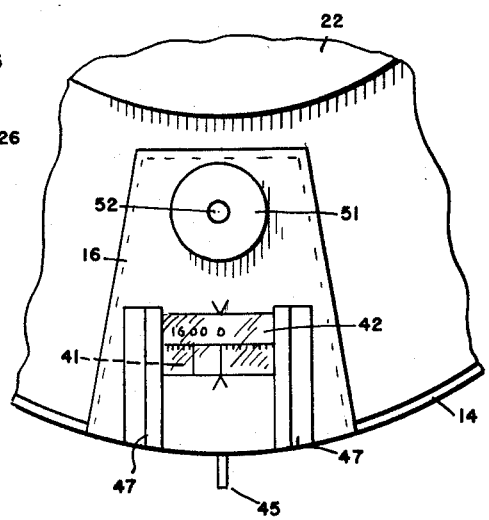
Figure 4 is a fragmentary plan view on an enlarged scale showing the shield removed as when the indicating dial is being read.

As shown in Figures 1, 2 and 3, the sections 21, 22 and 23 are arranged in step-like formation so that the bottles 24 are supported in an attractive as well as a convenient manner.

Arranged in the base 10 is a scale 30 which may be of conventional construction. The scale 30 may include a body member 31 that is provided with spaced apart arms 32. Bars 33 may have their upper ends connected to the housing 17, while the lower ends of the bars 33 may be provided with cutouts or slots 34 for engaging lugs 35 on the movable arms 32, Figure 10. The arms 32 may be pivotally supported by fulcrums 36, Figure 6, and a finger 37 is adapted to be actuated by the movable arms 32, in the usual manner. The finger 37 may be connected to the lower end of a rack 38 which is provided with teeth 39 thereon, and the teeth 39 mesh with a gear member 40. The gear member 40 is connected to a rotary ring or dial 41 which may have indicia or scale markings thereon.

Mounted in the housing 17 is a viewing glass 42 which may be a magnifying glass so that the indicia on the dial 41 can be more readily observed or read. Normally arranged over the viewing glass 42 is a shield or guard 43, and the shield 43 includes a first vertical portion 44 which is adapted to have a hasp 45 arranged in engagement therewith, Figure 6. A suitable lock 46 is connected to the hasp 45. The shield 43 further includes a second portion 48 which slidably engages guide members 47, and the shield 43 further includes an upstanding portion 49 and a horizontal portion 50. Thus, by unlocking the lock 46, the proprietor or manager of the establishment can slide the shield 43 forwardly so as to expose the viewing glass 42 whereby the dial 41 can be read.

There is further provided a means for adjusting the dial 41 so that it can be set for a zero reading. This means comprises a knob 51 which is connected to a shank or stem 52, and a coil spring 53 may be connected to the shank 52, Figure 8. Thus, by properly rotating the knob 51, the tension of the coil spring 53 can be adjusted and the setting of the dial 41 can be adjusted or calibrated as desired.

Slidably connected to the front portion of the assembly is a shelf or platform 54 which can be extended when desired so as to provide a convenient support for a pad of paper or the like. Suitable handles 55 may be provided, Figure 3, so as to facilitate the manual handling of the unit. For preventing tampering with the mechanism inside the apparatus, a vertical bar 56 may be provided, Figure 6, and the bar 56 may have its lower end anchored as at 57 to the bottom wall 11 of the base 10. A lug 58 may be arranged in engagement with the bar 56, and a suitable lock 59 of conventional construction may be arranged in engagement with the upper end of the bar 56. When access is to be gained to the lock 59, the upper sections 22 and 23 can be readily lifted from the housing since these sections are not secured in place.

From the foregoing, it is apparent that there has been provided a bar accessory which will permit the proprietor or other person associated with a saloon, barroom, or the like to readily ascertain the inventory and condition of the stock of fluid such as alcoholic beverages. In use, a plurality of the bottles 24 are adapted to be supported on the sections 21, 22 and 23 as shown in the drawings, and the bottles 24 may be filled or partially filled with various alcoholic beverages such as whisky, liqueur, gin, or the like. The scale 30 which is arranged in the base 10 may be adjusted to zero position by means of the manually operable knob 51, and after the knob 51 has been manipulated, the shield 43 is retained in place by means of the lock 46. Thus, as previously described, the housing 17 is telescopically or adjustably connected to the base 10, so that the weight of the bottles 24 on the sections 21, 22 and 23 will cause the housing 17 to move downwardly in the base 10. This downward movement of the housing 17 causes the arms 33 to move downwardly and the arms 33 pivot the arms 32 which results in downward movement of the finger 37. The scale which is arranged in the base may be of conventional construction, and as the finger 37 moves downwardly, it moves the rack 38 downwardly which causes the teeth 39 to rotate the gear 40. As the gear 40 rotates, it turns the dial 41 which has the indicia or scale markings thereon, and this indicia is observed through the transparent window or magnifying glass 42. Thus, it is possible to obtain a reading of the weight of alcoholic beverages supported on the sections 21, 22 and 23 and this weight can be read before a given sales period and also it can be read after the termination of a predetermined length of time so that by checking the weight which has been sold or dispensed against the cash receipts, it is possible for the proprietor or manager of the establishment to readily check on the efficiency or honesty of employees such as bartenders.

Normally the shield 43 is in closed position over the viewing glass 42 and the shield 43 is maintained in this position by means of the lock 46. However, by unlocking the lock 46, the shield 43 can be removed as by an authorized person so that the dial ring 41 can be readily observed through the viewing glass 42. The bar 56 prevents further tampering with the device since the bar 56 maintains the parts connected together.

The slidable shelf 54 can provide a support for a stock inventory form as well as register readings or the like. The handles 55 can be used for lifting the sections 22 and 23 when desired. The present invention provides a combination measuring instrument and liquor display stand which tells the tavern owner or other person exactly how many drinks have been taken from his stock on the back bar for any given period of time and this is accomplished by taking readings from the dial 41 on the device. Since liquor is bought by the case, such as so many quarts or fifths in a case, and with thirty-two ounces to a quart or twenty-six ounces to a fifth, the unit of measure in both purchase and sales is the ounce. Therefore, a standard drink is one ounce. The present invention is a liquor stand which is mounted on a suitable scale that includes the dial 41 which may be calibrated in ounces. The weight of the empty bottles 24 plus the actual weight of the stand mounting, can be computed and the dial 41 can be adjusted to zero reading when loaded with the empty bottles. The dial 41 can be read from the front of the device and a magnifying glass can be provided for facilitating reading of the dial. The metal shield 43 permits only the owner to have access to the dial so that only the owner will have knowledge of exact shortages and discrepancies. The device can be made of any suitable material and of any desired shape and size.

The Internal Revenue Service expects an establishment to receive, pay and operate and pay taxes on twenty-seven ounces of each thirty-two ounces purchased from the supply house. Furthermore, there is a great element of risk on the owner's part to get the money in the cash register from the time the liquor leaves the stand. The present invention accurately checks the liquor out and the cash register checks it in. The present invention can also be used for valuable chemicals, liquids, hair tonic, perfume or the like. The present invention is adapted to be used in establishments which serve, sell and dispense whisky or other alcoholic beverages, and the device can be placed on the back bar of the establishment. The device weighs the liquor on the stand and shows the total amount in ounces which is the basis of purchase and sales. The owner knows exactly how much has been taken out of stock on the stand so that by checking the cash register, he can compute his loss. Thus, the owner can completely eliminate the expensive way of a haphazard guess and will know at all times which bartender shows a profit for the establishment and those that have greater shortages.

I claim:

1. In a weighing mechanism for weighing the amount of alcoholic beverages dispensed, a base including a horizontally disposed bottom wall, a vertically disposed back wall extending upwardly from the rear edge of said bottom wall, a pair of spaced apart side walls extending upwardly from said bottom wall and interconnected by an arcuate front wall, a vertically disposed leg extending upwardly from said front wall and terminating in a horizontally disposed flange, a vertically shiftable housing arranged above said base and including a plurality of sections of different sizes, said sections including horizontally disposed wall members providing supports for bottles of alcoholic beverages, said housing including depending and vertically disposed wall members arranged contiguous to the inner surfaces of the walls of the base, weighing mechanism arranged in said base and actuated by movement of said housing, said mechanism serving to indicate the weight of the housing; bottles and alcoholic beverages being supported on the housing.

2. In a weighing mechanism for weighing the amount of alcoholic beverages dispensed, a base including a horizontally disposed bottom wall, a vertically disposed back wall extending upwardly from the rear edge of said bottom wall, a pair of spaced apart side walls extending upwardly from said bottom wall and interconnected by an arcuate front wall, a vertically disposed leg extending upwardly from said front wall and terminating in a horizontally disposed flange, a vertically shiftable housing arranged above said base and including a plurality of sections of different sizes, said sections including horizontally disposed wall members providing supports for bottles of alcoholic beverages, said housing including depending and vertically disposed wall members arranged contiguous to the inner surfaces of the walls of the base, a weighing mechanism arranged in said base and actuated by movement of said housing, said mechanism serving to indicate the weight of the housing, bottles and alcoholic beverages being supported on the housing, an indicator dial actuated by said scale, a viewing glass arranged above said dial, a movable shield arranged above said viewing glass, and a lock for selectively maintaining said shield in position over said viewing glass.

3. The structure as defined in claim 2 and further including manually operable means for adjusting the indicator dial to zero position.

4. The structure as defined in claim 2 wherein said sections are arranged in stepped formation.

5. In a weighing mechanism for weighing the amount of alcoholic beverages dispensed, a base including a horizontally disposed bottom wall, a vertically disposed back wall extending upwardly from the rear edge of said bottom wall, a pair of spaced apart side walls extending upwardly from said bottom wall and interconnected by an arcuate front wall, a vertically disposed leg extending upwardly from said front wall and terminating in a horizontally disposed flange, a vertically shiftable housing arranged above said base and including a plurality of sections of different sizes, said sections including horizontally disposed wall members providing supports for bottles of alcoholic beverages, said housing including depending and vertically disposed wall members arranged contiguous to the inner surfaces of the walls of the base, weighing mechanism arranged in said base and actuated by movement of said housing, said mechanism serving to indicate the weight of the housing, bottles and alcoholic beverages being supported on the housing, an indicator dial actuated by said scale, a viewing glass arranged above said dial, a movable shield arranged above said viewing glass, and a lock for selectively maintaining said shield in position over said viewing glass, manually operable means for adjusting the indicator dial to zero position, said sections being arranged in stepped formation, said dial being calibrated in ounces.

References Cited in the file of this patent

UNITED STATES PATENTS

| | | |
|---|---|---|
| Re. 16,323 | Weber | Apr. 13, 1926 |
| 604,454 | Boynton | May 24, 1898 |
| 667,835 | Weiss | Feb. 12, 1901 |
| 731,710 | Renken | June 23, 1903 |
| 918,549 | Heimann et al. | Apr. 20, 1909 |
| 2,279,375 | Manning | Apr. 14, 1942 |
| 2,649,294 | Walter | Aug. 18, 1953 |
| 2,649,969 | Andrews | Aug. 25, 1953 |
| 2,739,806 | Stelzer | Mar. 27, 1956 |